(12) United States Patent
Girschig et al.

(10) Patent No.: US 11,913,433 B2
(45) Date of Patent: Feb. 27, 2024

(54) LIGHTNING PROTECTION FOR A ROTOR BLADE ADD-ON

(71) Applicant: Siemens Gamesa Renewable Energy A/S, Brande (DK)

(72) Inventors: Florian Girschig, Aalborg (DK); Sri Markandeya Rajesh Ponnada, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 539 days.

(21) Appl. No.: 16/580,513

(22) Filed: Sep. 24, 2019

(65) Prior Publication Data

US 2020/0095983 A1    Mar. 26, 2020

(30) Foreign Application Priority Data

Sep. 26, 2018 (EP) ................... 18196894

(51) Int. Cl.
| | |
|---|---|
| *F03D 80/30* | (2016.01) |
| *F01D 5/14* | (2006.01) |
| *F03D 1/06* | (2006.01) |
| *F03D 80/50* | (2016.01) |

(52) U.S. Cl.
CPC ............ *F03D 80/30* (2016.05); *F01D 5/147* (2013.01); *F03D 1/0675* (2013.01); *F03D 1/0687* (2023.08); *F03D 80/301* (2023.08); *F03D 80/507* (2023.08); *F05B 2230/80* (2013.01); *F05D 2230/80* (2013.01); *F05D 2300/612* (2013.01)

(58) Field of Classification Search
CPC ...... F03D 80/30; F03D 1/0675; F03D 80/301; F03D 1/0642; F03D 1/0687; F03D 80/507; F01D 5/147; F05B 2240/307; F05B 2230/80; F05B 2280/6012; H02G 13/80

See application file for complete search history.

(56) References Cited

U.S. PATENT DOCUMENTS

| | | | |
|---|---|---|---|
| 2009/0139739 A1 | 6/2009 | Hansen | |
| 2012/0003094 A1 | 1/2012 | Hansen | |
| 2014/0140854 A1* | 5/2014 | Kirkegaard | ............. F03D 80/00 416/229 R |
| 2016/0201650 A1 | 7/2016 | Okazaki et al. | |

(Continued)

FOREIGN PATENT DOCUMENTS

| | | |
|---|---|---|
| CA | 2742487 A1 | 12/2011 |
| CN | 107076123 A | 8/2017 |

(Continued)

OTHER PUBLICATIONS

Extended European Search Report in European Patent Application No. 18196894.2, dated Mar. 20, 2019. 8 pages.

(Continued)

*Primary Examiner* — Christopher Verdier
(74) *Attorney, Agent, or Firm* — Schmeiser, Olsen & Watts LLP (57) ABSTRACT

Provided is an arrangement for discharging current due to a lightning stroke at a tip add-on of a rotor blade of a wind turbine, the arrangement including a conductor adapted to conduct the current due to the lightning stroke; an insulation arranged around the conductor, the insulation with the conductor being arrangeable within the tip add-on.

13 Claims, 5 Drawing Sheets

(56) References Cited

U.S. PATENT DOCUMENTS

| | | | |
|---|---|---|---|
| 2016/0258423 A1* | 9/2016 | Whitehouse | .......... F03D 1/0675 |
| 2017/0321661 A1 | 11/2017 | Mieritz et al. | |
| 2018/0135602 A1 | 5/2018 | Tobin et al. | |
| 2022/0034306 A1* | 2/2022 | Sørensen | .......... H01R 13/6215 |

FOREIGN PATENT DOCUMENTS

| | | |
|---|---|---|
| CN | 108547744 A | 9/2018 |
| EP | 1957791 A1 | 8/2008 |
| EP | 2226497 A1 | 9/2010 |
| EP | 2395239 A1 | 12/2011 |
| EP | 2441926 A1 | 4/2012 |
| GB | 2519331 A | 4/2015 |
| WO | 2012136243 A1 | 10/2012 |
| WO | 2018019349 A1 | 2/2018 |

OTHER PUBLICATIONS

International Search Report for application No. PCT/EP2018/051700 dated May 7, 2018.
Office Action in corresponding Chinese Patent Application No. 201910917015.7 dated Nov. 3, 2020. 9 pages.

* cited by examiner

LIGHTNING PROTECTION FOR A ROTOR BLADE ADD-ON

FIELD OF TECHNOLOGY

The following relates to an arrangement for a discharging current due to a lightning stroke at a tip add-on of a rotor blade of a wind turbine, relates to a tip add-on for a rotor blade of a wind turbine, and relates further to a retrofitted rotor blade for a wind turbine. Furthermore, the following relates to a method of manufacturing an arrangement for discharging a current due to lightning stroke at a tip add-on of a rotor blade of a wind turbine, relates to a manufacturing method of a tip add-on of a rotor blade and finally relates to a method of retrofitting a rotor blade with a tip add-on.

BACKGROUND

A wind turbine may comprise a rotation shaft at which plural rotor blades are connected. The rotation shaft may drive a generator to generate electric power upon rotation of the rotation shaft. The rotor blades nowadays become longer and longer and thereby reach into substantial height above the ground. Thus, rotor blades, being the most exposed part of the wind turbine, may be frequently subjected to lightning strikes or lightning strokes. Thereby, the probability of the strike impact is highest at the tip end and may decrease as one proceeds towards the root of the blade.

Rotor blades may also be retrofitted with so-called tip add-ons, such as extensions and/or winglets. In a retrofitted rotor blade, the tip add-on may become the new tip end of the rotor blade, thereby increasing the effective blade length. In this case, the tip add-ons are the components having the highest risk to be impacted by a lightning stroke. Tip add-ons may usually be manufactured from non-conducting materials. These may make them highly vulnerable to lightning strokes. Thus, an effective lightning protection system (LPS) may be required to protect these components from catastrophic damage.

Conventionally, lightning protection for add-ons may be achieved by providing the former with lightning attachment points on the surface (receptors) connected to an internal down conduction system (IDCS). IDCS may usually be composed of a metallic cable and connected metal blocks at the receptor portion positions. The cable may become the grounding path and the receptor blocks may serve as mounting points for the receptors. When the add-on is mounted to an existing rotor blade, the IDCS of the add-on is connected to the already grounded blade IDCS. By doing so, a safe path to ground for the lightning current may be provided.

For effective protection, it may be critical that the lightning attaches only to the designated lightning attachment points (also referred to as receptors) but not to the IDCS itself.

Thus, there may be a need for an arrangement for a discharging current due to a lightning stroke at a tip add-on of a rotor blade of a wind turbine, for a tip add-on for a rotor blade of a wind turbine, for a retrofitted rotor blade for a wind turbine, for a method of manufacturing an arrangement for discharging a current due to lightning stroke at a tip add-on of a rotor blade of a wind turbine, for a manufacturing method of a tip add-on of a rotor blade, and for a method of retrofitting a rotor blade with a tip add-on, wherein a reliable lightning protection is enabled and also supporting existing design and construction of rotor blades. Further, it may be desired to achieve a lightning protection system for a tip add-on of a rotor blade, wherein lightning strokes are essentially confined or restricted to impact at predetermined reception position.

SUMMARY

According to the embodiment of the present invention, it is provided an arrangement for discharging current due to a lightning stroke at a tip add-on of a rotor blade of a wind turbine, the arrangement comprising: a conductor adapted to conduct the current due to the lightning stroke; an insulation arranged around the conductor; the insulation with the conductor being arrangeable within the tip add-on.

The tip add-on may comprise an airfoil section or an aerodynamic profile such as formed by an outer surface of an airfoil wall. The tip add-on may be configured to be retrofitted to the existing rotor blade to extend the effective rotor blade length and/or to adapt or modify or improve the aerodynamic performance of the rotor blade. For this purpose, the tip add-on may be installed or connected at the former (longitudinal) end of the rotor blade.

The arrangement is provided for protecting the tip add-on from damages due to lightning stroke in that the current caused by the lightning stroke is discharged using the conductor of the arrangement, wherein the conductor is in particular connectable or connected to a respective internal conductor of the rotor blade. The conductor may for example be arranged to withstand a high voltage lightning stroke involving currents as high as 200,000 A, e.g. in the range between 100 A and 200 kA. The conductor may be manufactured from one or more different metals, such as aluminium, steel, bronze, etc. and may be flexible or rigid, at least section-wise. The conductor may partly be formed from flexible cable comprising several wires and/or may be manufactured from an integrally formed metal bar for example. The conductor may in particular have an elongated shape which may have a length almost as long as the tip add-on.

The insulation may comprise synthetics, in particular a polymer, and may be flexible or rigid. When the insulation is arranged around the conductor, the lightning stroke may only impact at predetermined positions of conducting receptors (which are electrically connected to the conductor) but not at any other position along the conductor for example. When the lightning strokes are restricted or confined to impact at the particular position (in particular at the conducting receptors installed at particular predetermined positions), damage of the tip add-on (in particular the airfoil therefrom) may be reduced or even avoided, since the high current and high voltage may be discharged via the conducting receptor(s) and the conductor to a ground path provided within the rotor blade, without carrying a current partly through an insulating airfoil wall of the tip add-on.

When or after a lightning stroke is discharged via the conducting receptor connected with the conductor and via the conductor towards a ground path (within the rotor blade), the airfoil section of the tip add-on may not suffer any damage and also the rotor blade may not suffer any damage. Thus, effective lightning protection of the tip add-on (and also the rotor blade) is thereby enabled.

The tip add-on may be formed by an airfoil wall surrounding an inner space. Within this inner space, the insulation together with the conductor (surrounded by the insulation) is placeable or arrangeable. In particular, the insulation with the conductor may be arrangeable within the inner space of the tip add-on at predetermined or desired positions and/or orientation. Thereby, positions of conducting receptors later on to be connected to the conductor (in particular receptor base portions) may be located at desired positions.

The electrical insulation of the conductor (in particular internal down conductor system, IDCS) within the tip add-on may be a convenient way to achieve that the lightning stroke impacts only to designated lightning attachment points or in particular conducting receptors, but not to any other portions of the conductor. A sufficient insulation may be achieved by sufficient thickness of the insulation material (for example polyurethane) over metal components and/or insulated high-voltage cable. The insulation may best be carried out on (essentially) the entire length of the conductor within the add-on including the interface to an existing blade, where most of the lightning strikes are expected to occur.

According to any embodiment of the present invention, the insulation completely surrounds the conductor except at one end at which the tip add-on is to be connected to the rotor blade.

When the insulation completely surrounds the conductor, lightning stroke impact may be confined to the desired positions of the conducting receptor(s) connected to the conductor. The insulation may encapsulate the conductor essentially leaving only one end free which is connected to a conductor within the rotor blade for providing a ground path.

According to any embodiment of the present invention, the insulation, in particular made of polymer, has a shape so as to restrict the location of the arrangement within the add-on to be in a predetermined position and/or extended configuration.

Depending on the shape of the inner space of the add-on, also the shape of the insulation may be adjusted or adapted to the particularities of the tip add-on. The arrangement may for example, during manufacturing the tip add-on, be laid within the inner space of the tip add-on and may be moved or shifted to achieve a particular desired position of below described receptor base portion(s) to which later on conducting receptors are electrically connected. Thereby, manufacturing the tip add-on including the lightning protection arrangement is enabled.

According to an embodiment of the present invention, the conductor, in particular comprising aluminum and/or steel and/or bronze and/or being partly flexible or rigid, comprises: at least one receptor base portion, in particular plural receptor base portions, arranged to electrically and mechanically connect, in particular by screwing, thereto a conducting receptor to be exposed outside of the tip add-on, in particular protruding from an outer surface of the tip add-on, to receive a lightning stroke.

One or several receptor base portions may be provided, such as for example 1 to 5 or 1 to 10 receptor base portions. Each receptor base portion may be configured to allow electrically and/or mechanically connection of one or more respective conducting receptor(s). The conducting receptor (for example 1 to 5 or 1 to 10 conducting receptors) may for example be formed from a bolt and/or one or more washers. The conducting receptor may, for the finished tip add-on, protrude from an airfoil of the tip add-on to the outside. The positions of the conducting receptor(s) define the desired lightning impact points. A one or more conducting receptor(s) may for example be arranged close to or at the tip end of the tip add-on. The conducting receptors may for example be screwed into internal threads provided within the receptor base portion. Washers may be utilized in order to adjust the height with which the respective conducting receptor protrudes from the airfoil. A lightning stroke may then impact to one or more of the conducting receptors and the current may be discharged via the conducting receptors, the receptor base portion and other portions of the conductor and further via an internal conductor arranged within the rotor blade to ground.

According to an embodiment of the present invention, the conductor comprises an interface portion adapted to be electrically connected to a connection portion of a blade internal down conductor system (MCS) for discharging lightning stroke currents.

The interface portion may also be adapted to be mechanically connected to a connection portion of the blade internal down conductor system. Thereby, the conductor and the entire arrangement for discharging current may mechanically be fixed. Other means for mechanically fixing the arrangement to the tip add-on may be provided, such as connection means connecting the conductor and/or the insulation to an airfoil wall of the tip add-on, for example. Thereby, a satisfactory electrical connection between the lightning protection system (ITS) of the blade and the tip add-on may be provided. Thereby, lightning protection components of the rotor blade may be utilized for also providing lightning protection for a tip add-on. The conducting receptors may function as means for interception of the lightning stroke and further for transferring lightning current to the respective receptor base portion and via other portions of the conductor to ground.

According to an embodiment of the present invention, the interface portion comprises at least one connection plate, in particular to be joined with a connection plate of the blade internal down conductor system, in particular including a lap joint.

The connection plate may for example have a rectangular or quadratic shape and may comprise one or more through-holes via, which the connection plate of the arrangement or the conductor and the connection plate of the blade internal down conductor system may be connected to each other. In particular, main surfaces of the connection plate may thereby touch each other and may be pressed together. Thereby, a reliable and secure and stable connection (electrically and/or mechanically) between the conductor and the blade internal down conductor system may be provided. The lap joint may be formed by overlapping connection plates and securing the connection plates to each other.

According to an embodiment of the present invention, the interface portion is configured to electrically and mechanically connect thereto one or more conducting receptor(s), in particular a pair of conducting receptors, to be exposed outside the tip add-on.

Thereby, the interface portion may provide a double-function, firstly electrically connect the conductor with a blade internal down conductor system and further allow electrically and mechanically connection to one or more conduction receptors, which may further act as a recipient of a potential lightning stroke. Thereby, the risk of damage due to a lightning stroke may further be reduced.

According to an embodiment of the present invention, the arrangement further comprises an interface receiving container (e.g. foam stop box) adapted to receive the interface portion including some margin and to protect the interface portion from being contaminated during manufacturing the tip add-on, in particular during foaming the inside of the tip add-on.

The interface receiving container may also be referred to or function as a foam stop box. Within the interface receiving container at least the interface portion may be placed with a particular margin (tolerance) such as to allow slightly adjusting the position and/or orientation of the interface portion in a manufacturing or retrofitting step of electrically and/or mechanically joining the interface portion (in particular using the connection plate) to a blade internal down conductor system. This manufacturing step may require slight positional and/or orientational re-adjustment of the interface portion. Since it is arranged within the interface receiving container, it will not be encapsulated (directly) with foam or other filling material which may be filled into the inside of the tip add-on. Thus, even if essentially the entire inside space of the tip add-on may have been filled with foam or with other filling material, the interface portion may be free to be slightly moved to reach a position and/or orientation, where the interface portion (in particular via the connection plate) can be connected to the blade internal down conductor system (in particular with the connection plate thereof). During the installation of the tip add-on at the rotor blade, the moving freedom of the interface, in conjunction with the conical shape of the interface's entrance, may ensure that the blade-side connection plate will be guided inside the tip-add-on side interface. Thereby, installation of the tip add-on at the rotor blade may be simplified and improved.

According to an embodiment of the present invention, the conductor comprises between different adjacent receptor base portions and/or between a receptor base portion and the interface portion: a spacer portion, wherein the receptor base portion and/or the interface portion is larger in cross-section than the spacer portion, wherein between a receptor base portion and the interface portion the spacer portion is in particular formed at least partly as a flexible cable.

The spacer portion may be smaller in thickness and/or cross-sectional area than the receptor base portion(s) and the interface portion. Thereby, weight may be reduced. When the spacer portion is at least partly formed by a flexible cable, conventionally available components may be utilized, thereby reducing costs of the arrangement.

According to an embodiment of the present invention, it is provided a tip add-on for a rotor blade of a wind turbine, comprising an airfoil wall enclosing an inner space, an arrangement according to one of the preceding embodiments arranged within the inner space, wherein the tip add-on is in particular configured as or comprises at least one of: a winglet; a tip extension. Thereby, a tip add-on including a reliable lightning stroke protection system is provided.

According to an embodiment of the present invention, it is provided a retrofitted rotor blade for a wind turbine, comprising a rotor blade including a blade internal down conductor system; and a tip add-on according to the preceding embodiment connected at an end of the rotor blade, wherein the conductor of the arrangement for discharging current due to a lightning stroke of the tip add-on is electrically connected to the blade internal down conductor system.

The retrofitted rotor blade may have extended length and/or improved aerodynamic, while also reliably protected against the risk of damage due to lightning strokes.

It should be understood that features, individually or in any combination, disclosed, described, provided or applied to an arrangement for discharging current due to a lightning stroke at a tip add-on of a rotor blade of a wind turbine or applied to a tip add-on or applied to a retrofitted rotor blade, may, according to the embodiments of the present invention, individually or in any combination, also be applied to a method of manufacturing an arrangement for discharging a current, to a method of manufacturing a tip add-on of a rotor blade and also to a method of retro-fitting a rotor blade with a tip add-on according to embodiments of the present invention and vice versa.

According to an embodiment of the present invention, it is provided a method of manufacturing an arrangement for discharging a current due to lightning stroke at a tip add-on of a rotor blade of a wind turbine, the method comprising: providing a conductor adapted to conduct the current due to the lightning stroke; arranging around the conductor an insulation, the insulation with the conductor being arrangeable within the tip add-on.

According to an embodiment of the present invention, it is provided a method of manufacturing a tip add-on of a rotor blade, comprising manufacturing an airfoil wall partly enclosing an inner space; manufacturing an arrangement for discharging a current due to lightning stroke according to the preceding embodiment; and arranging the arrangement for discharging a current within the inner space of the tip add-on; in particular further comprising foaming the inner space.

According to an embodiment of the present invention, it is provided a method of retrofitting a rotor blade with a tip add-on, comprising performing a method of manufacturing a tip add-on of a rotor blade according to the preceding embodiment; removing a blade tip receptor portion, if present, from the rotor blade; installing a blade interface component at the rotor blade; electrically connecting the installed blade interface component with the interface portion of the tip add-on; mechanically coupling the tip-add-on to an end of the rotor blade.

Furthermore, a wind turbine and a corresponding manufacturing method are provided.

BRIEF DESCRIPTION

Some of the embodiments will be described in detail, with reference to the following figures, wherein like designations denote like members, wherein.

DETAILED DESCRIPTION

Figure 1:
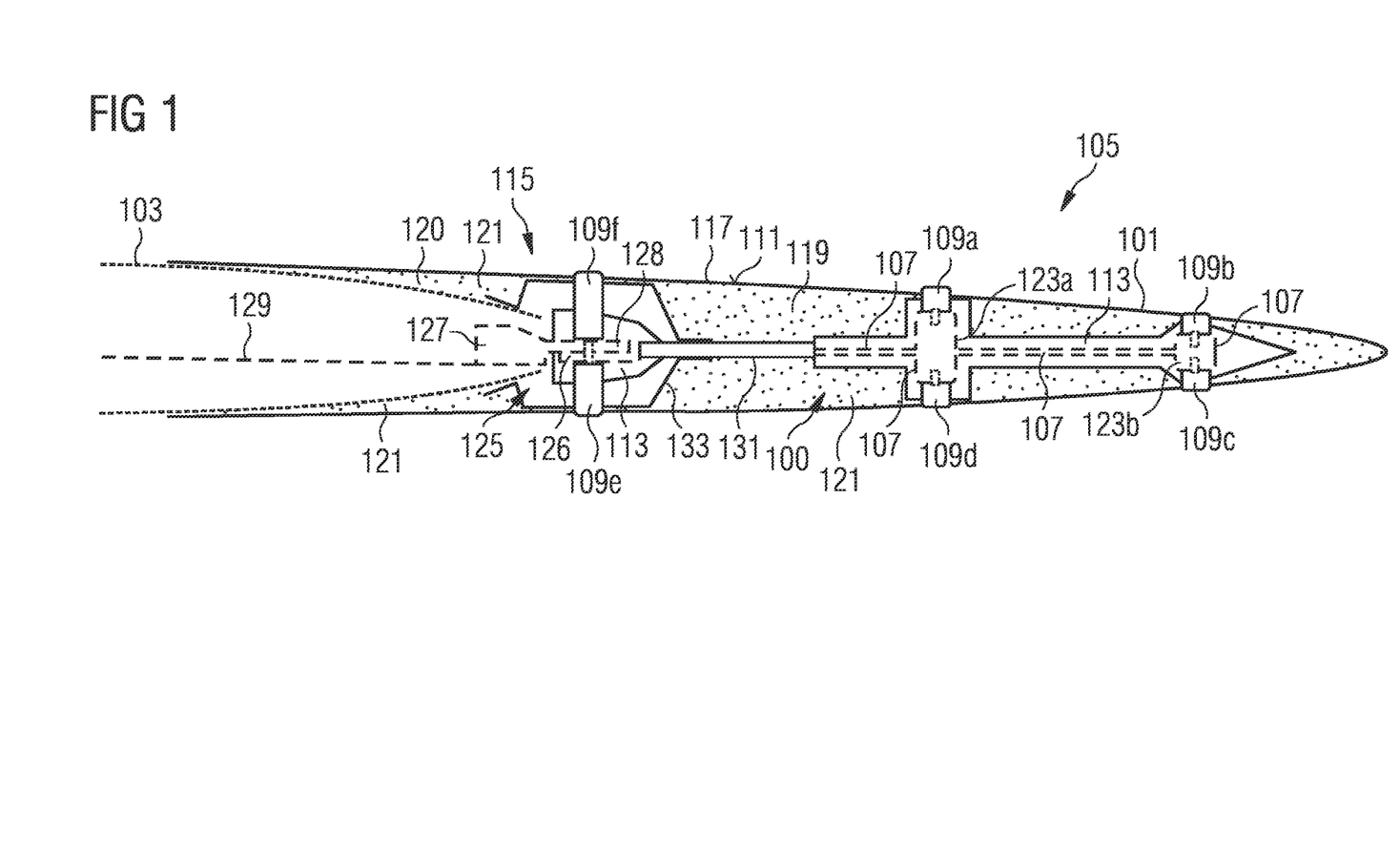
FIG. 1 schematically illustrates a retrofitted rotor blade including a tip add-on for a rotor blade according to an embodiment of the present invention comprising an arrangement for discharging current to a lightning stroke according to an embodiment of the present invention in a schematic cross-sectional view.

FIG. 1 illustrates in a schematic sectional view a retrofitted rotor blade 105 according to an embodiment of the present invention. The retrofitted rotor blade 105 includes an arrangement 100 for discharging current due to a lightning stroke at a tip add-on 101 of a rotor blade 103 of a wind turbine according to an embodiment of the present invention and the tip add-on 101. The arrangement 100 is in FIG. 1 shown as installed within the tip add-on 101 which is in the illustrated embodiment configured as a tip extension, thereby effectively extending the length of the rotor blade 103. In particular, the rotor blade 103 having installed thereon the tip end add-on including the arrangement 100 forms the retrofitted rotor blade 105 according to an embodiment of the present invention.

The arrangement 100 comprises a conductor 107 extending through most of the inner space 119 of the add-on and which is made up of several components. In particular, the conductor 107 is adapted to conduct the current due to the lightning stroke which is received at conducting receptors 109a, 109b, 109c, 109d, 109e and 109f, which are arranged at different positions of the tip add-on and which protrude from an airfoil 111 of the tip add-on 101 by for example between 0.1 mm and 20 mm or between 0.5 mm and 10 mm or between 0.5 mm and less than 20 mm.

The conductor 107 is surrounded by an insulation 113. While FIG. 1 only shows a sectional view, the insulation 113 completely surrounds the conductor 107 except at one end 115 at which the tip add-on 101 is to be connected to the rotor blade 103.

The tip add-on 101 comprises an airfoil wall 117 having the outer surface 111 (airfoil) and surrounding an inner space 119 of the tip add-on 101. The arrangement 100 is arranged within the inner space 119, wherein the rest of the inner space 119 is filled with foam 121 (illustrated with patterned dots). Further the space 120 inside the add-on 101 and outside the end of the rotor blade 103 onto which the add-on is imposed may be filled with foam. As can be taken from FIG. 1, the insulation 113 has a shape so as to restrict the location of the arrangement 100 within the inner space 119 to be in a particular position and orientation.

In particular, it is intended that the conducting receptors 109a, . . . 109f are at defined positions. For this purpose, the conductor 107 comprises at least one receptor base portion 123a, 123b, which is arranged and configured to electrically and mechanically connect one or more conducting receptor(s) 109a, . . . 109f thereto, which are then exposed outside the tip end add-on 101, to receive a lightning stroke.

The conductor 107 comprises an interface portion 125 it is adapted to be electrically connected to a connection portion 127 of a blade internal down conductor system 129, which is only schematically illustrated in FIG. 1. Thereby, a lightning stroke impacting at one of the conducting receptors 109a, . . . 109f is conducted via the respective conducting receptor, via the receptor base portion (at which the conducting receptor is connected) 123a, 123b, via a spacer portion 131, via the interface portion 125, via the connection portion 127 and via the internal down conductor system 129 to ground.

In particular, the spacer portion 131 is between the receptor base portion 123a and the interface portion 125 and is part of the conductor 107. Therein, the spacer portion 131 has a smaller cross-sectional size than the receptor base portions 123a, 123b and also than the interface portion 125.

The spacer portion of the conductor 107 may for example be configured as a flexible cable also having a not-illustrated insulation or cladding.

The arrangement 100 further comprises an interface receiving container 133 (also referred to as foam stop box) adapted to receive the interface portion 125 including some margin (remaining space between inner surfaces of the interface receiving container 133 and outside surfaces of the interface portion 125) and to protect the interface portion 125 from being contaminated during manufacturing the tip add-on, in particular during forming the inside 119 of the tip add-on 101. As is also illustrated in FIG. 1, in this embodiment, the interface portion 125 is configured to electrically and mechanically connect thereto a conducting receptor 109f, 109e to be exposed outside the tip add-on 101.

Figure 2:
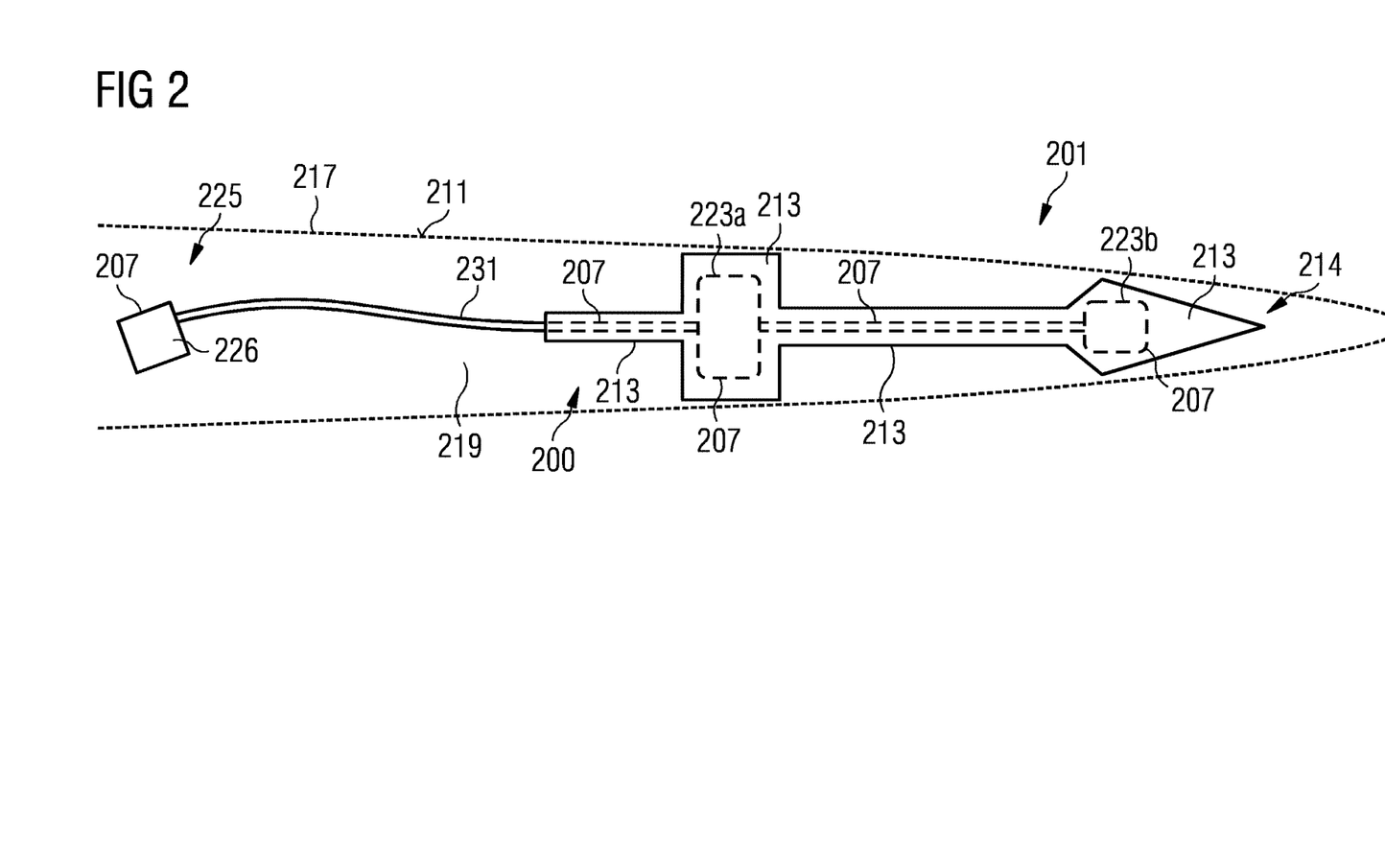
FIG. 2 schematically illustrates a tip add-on including an arrangement for discharging current due to a lightning stroke according to an embodiment of the present invention as applied to a tip extension.

FIG. 2 schematically illustrates in a sectional view a tip add-on 201 according to an embodiment of the present invention comprising an arrangement 200 for discharging current due to a lightning stroke according to an embodiment of the present invention. The tip add-on 201 is configured as a tip extension.

Components and elements similar or same in structure and/or function are labeled in different illustrations with reference signs differing only in the first digit. A description of an element not in particular described in a particular embodiment can be taken from the description in a respective other embodiment.

The conductor 207 of the arrangement 201 comprises a spacer portion 231, a receptor base portion 223a and another receptor base portion 223b similar as in the embodiment illustrated in FIG. 1. The conductor 207 is surrounded by an insulation 213. In the illustrated embodiment, the inner space 219 of the tip add-on 201 is not foamed or not filled with filling solid material. Different from the embodiment illustrated in FIG. 1, the interface portion 125 of the conductor 207 may or may not form a receptor base portion. However, the interface portion comprises a connection plate 226.

Such a connection plate may also comprise in the interface portion 125 illustrated in FIG. 1 and labeled with reference sign 126. Herein, the connection portion 127 of the blade internal down conductor system also ends in a plate 128 which is in contact with the connection plate 126 of the interface portion 125 and which is for example tightened using bolts, to establish an electrical and at the same time mechanical connection.

In an end region the insulation 213 (see FIG. 2) exhibits diamond shape 214 or arrow-head shape or cylindrical shape. In cross-section, the insulation 213 surrounding the receptor base portion 223a may have a rectangular shape or oval shape or circular shape or even other shape fitting into the inside 219 of the tip add-on 201. The insulation may e.g. have a cylindrical shape.

Figure 3:
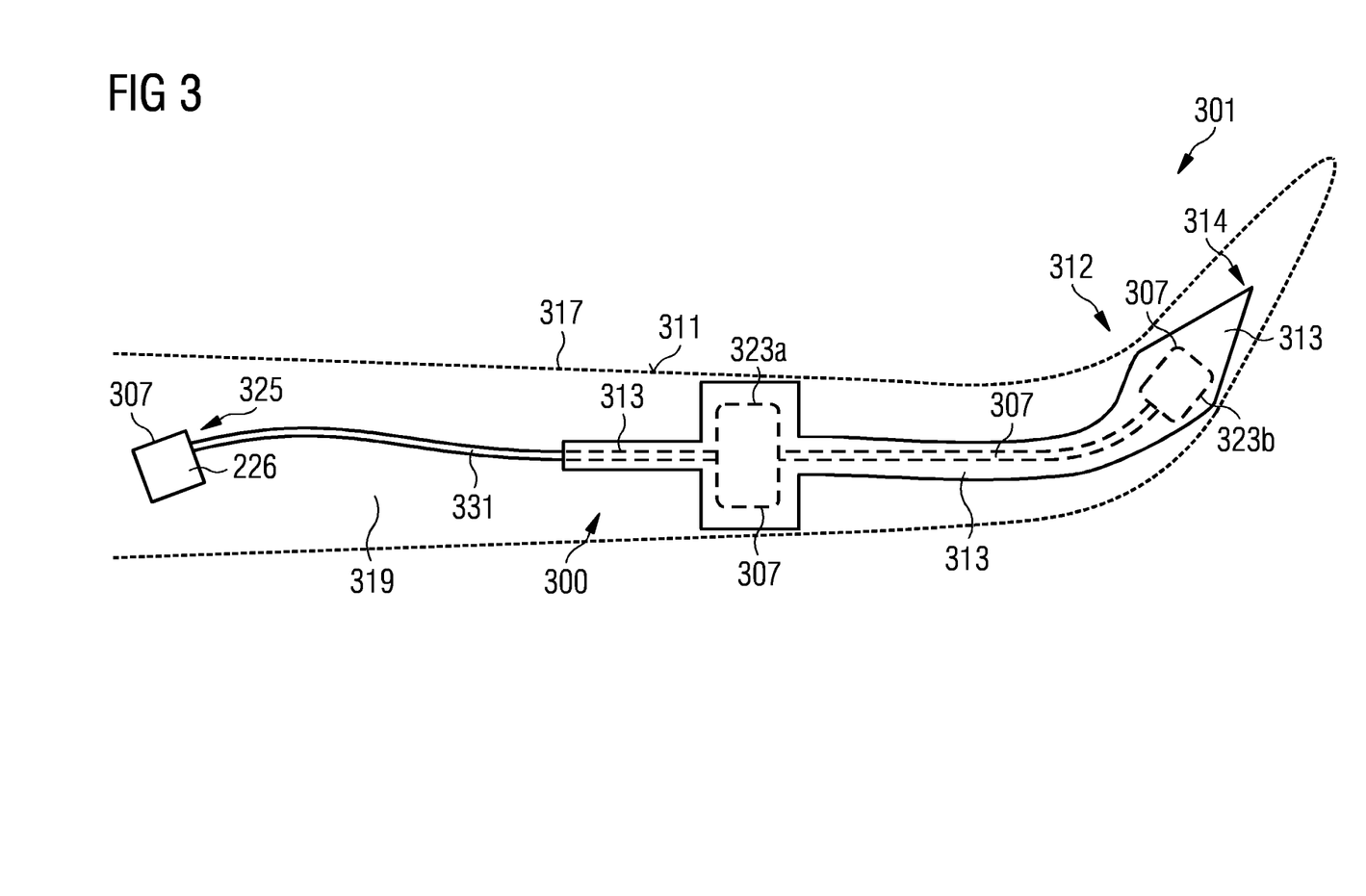
FIG. 3 schematically illustrates in a cross-sectional view a tip add-on including an arrangement for discharging current due to a lightning stroke according to an embodiment of the present invention as applied to a winglet.

FIG. 3 schematically illustrates a tip add-on 301 according to an embodiment of the present invention comprising an arrangement 300 for discharging current due to a lightning stroke according to an embodiment of the present invention. Herein, the tip add-on 301 is configured as a winglet comprising an airfoil 311 of an airfoil wall 317, which has a bent 312 thereby improving the aerodynamics of the retrofitted rotor blade when the winglet 301 is installed at an end portion thereof.

The embodiments illustrated in FIGS. 2 and 3 may further comprise respective conductor receptors connected to respective receptor base portion, for example 223a, 223b or 323a or 323b. Since the conductor 307 is surrounded by the insulation 313, it may be assured that the lightning stroke impact preferably or exclusively at the desired position, where the respective conducting receptors are placed, i.e. close to the receptor base portions 223, 323.

Figure 4:
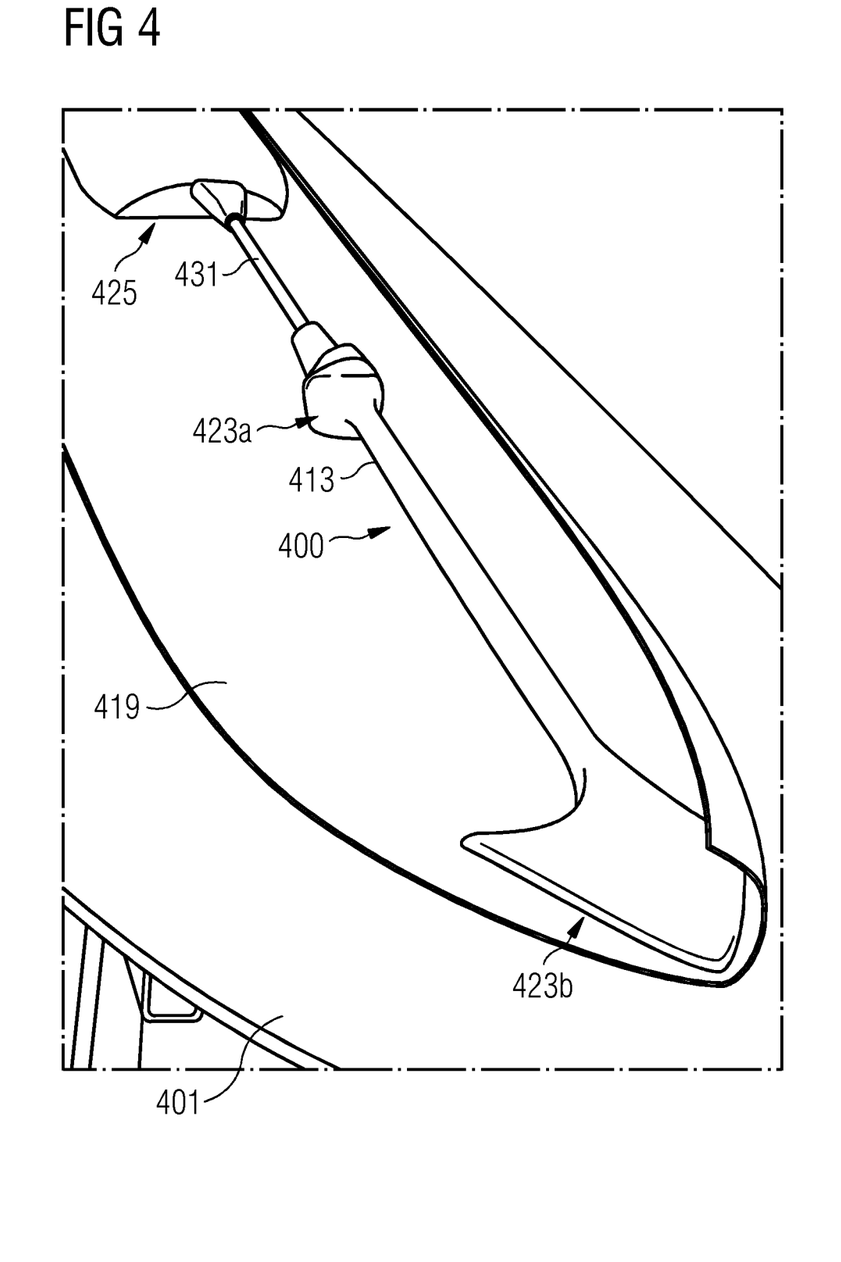
FIG. 4 illustrates in a perspective view a method step of manufacturing a tip add-on according to an embodiment of the present invention including an arrangement for discharging current due to a lightning stroke according to an embodiment of the present invention.

FIG. 4 illustrates a perspective view of a tip add-on 401 during manufacturing according to an embodiment of the present invention. During the manufacturing process the tip add-on is not yet closed so that the inner space 419 is visible. Within the inner space, an arrangement 400 for discharging current due to a lightning stroke, is placed. The insulation 413 surrounding a not-illustrated conductor, is visible. At one end the conductor has a receptor base portion 423*b* having a diamond-shaped insulation around. Another receptor base portion 423*a* is arranged further down towards the tip add-on root. Between the interface portion 425 and the receptor base portion 423*a*, the spacer portion 431 is arranged.

In a next manufacturing process, the tip add-on 401 will be closed and optionally the inside 419 will be foamed or filled with other filling material. Then, the conducting receptors will be attached by for example screwing bolts into internal threaded holes arranged or provided within the receptor base portion 423*a*, 423*b*.

Figure 5:
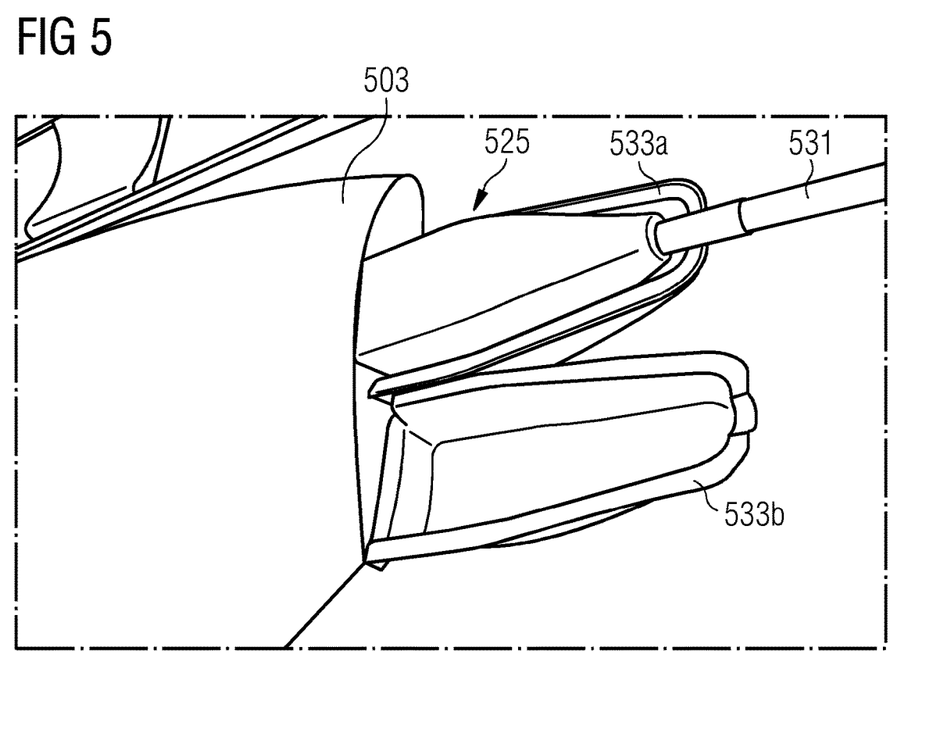
FIG. 5 illustrates in a perspective view an interface portion of a conductor of an arrangement for discharging current due to a lightning stroke according to an embodiment of the present invention, the interface portion being received in an interface receiving container for protection.

FIG. 5 illustrates in a perspective view two halves of an interface receiving container 533*a* (first half) and 533*b* (second half). The two halves 533*a* and 533*b* will be joined while the interface portion 525 is received therein with a particular margin. After closing or connecting the two halves 533*a* and 533*b*, the inner space 519 of the tip add-on can be foamed. Since the interface portion 525 is enclosed within the interface receiving container 533, the interface portion 525 still can be moved or turned a little bit in order to allow connection to a respective connection means of an internal down conductor system of a rotor blade.

Figure 6:
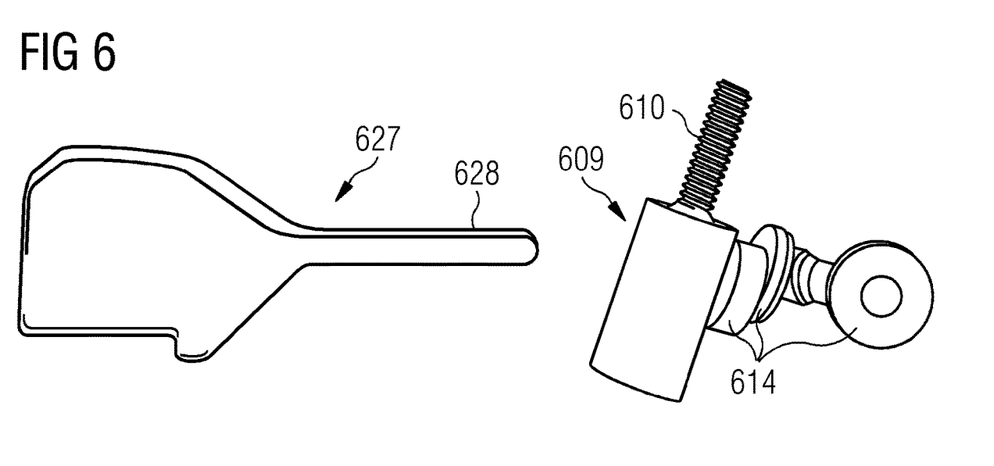
FIG. 6 illustrates components of a conductor of an arrangement for discharging current due to a lightning stroke according to embodiments of the present invention.

FIG. 6 illustrates a blade internal down conductor system having a connection plate 628, with which a respective connection plate (for example connection plate 126 of the embodiment illustrated in FIG. 1) will be connected to establish an electrical connection between the conductor within the tip add-on and a ground.

FIG. 6 further illustrates an example of a conducting receptor 609 having an outer threading 610 to enable connection to a respective receptor base portion, for example receptor base portion 123*a*, 123*b* illustrated in FIG. 1. For adjusting a protrusion height of the conducting receptor 609, one or more washers 614 may be utilized.

The LPS for the tip add-on may be designed to have at least one tip receptor block (also referred to as receptor base portion) and zero, one or more additional receptor blocks before interfacing to the rotor blade. The receptor blocks and the internal down conductor system between them may be encapsulated in insulation (polymer insulation such as PUR). The outer geometry of the LPS insulation may be adapted to that of the particular shape of the inner space of the tip add-on wherever required. The LPS units may be placed centrally in the tip add-on and the space between the insulated LPS and the shells of the add-on may be foamed up with a structural material, thereby rendering the LPS system as an integral part of the tip add-on structure. Receptors may be mounted after the add-on is manufactured by drilling into the receptor blocks. The insulated, high-voltage down conductor cable from the tip add-on LPS is then connected to that of the blade either directly (soldering, crimping, etc.) or via a specially designed interface.

In order to maintain the freedom of the interface component in the tip add-on (to provide a tolerance while installing the tip extension to the blade), even after the foaming operation, a foam stop box (also referred to as interface receiving container) adding two halves for example is used that is adhered to the add-on shells during manufacture. The box may also protect the add-on interface component from foam contamination that may hinder electrical connection.

An embodiment of such a specially designed interface mentioned above could be such that the IDCs from the blade and the add-on terminate into two parallel conducting plates at their interface and these blades (also referred to as connection plates) may form a lap joint when pressed by a pair of nut-bolt type (interface) receptors. One of the terminations may also take a U-shaped profile leading to a double-lap joint if required. While a termination in the form of a plate is possible with the add-on IDC as it is a new design for the blade, this is realized by replacing the blade tip receptor block with a newly designed part. A hole made through the plates (add-on cross-section) during the tip extension installation process to mount the receptors that secure the plates in place, apply pressure, and form a conductive joint. These receptors may be a feature of the system that adds protection to the interface region which like in all systems is susceptible to damage. The interface receptors may be designed with a standard depth, while washers made from a relatively softer conducting material are available in multiple sizes and may be used to achieve the correct protrusion of the receptors from the blade/add-on surface. Similarly, one or more, in particular both, of the interface components may also be provided with insulation such that it covers the interface region. As against a blind connection, the hole made to install the receptors may become a view-hole to confirm that the metal plates of the interface have lined-up and that a reliable connection could be established. All open spaces may be ultimately filled up with adhesive.

Embodiments of the present invention may have the following advantages:

The LPS unit is introduced into the tip add-on during the latter's manufacture and is thus structurally fixated.

LPS in the add-on is completely insulated. Insulation provided by the add-on structure adds to this.

The mass increase due to the LPS insulation is limited by the compensating decrease in weight of structural foam.

Use of flexible down conductor (supported by foam stop box) may allow for LPS connection between add-on and blade insulated LIPS even in the case of large geometric tolerance.

Blade preparation may be relatively minor for IDCS integration.

The foam stop box may protect the LPS interface from contamination by structural material.

Interface receptors may help to realize the interface in the LPSs, provide lightning protection, allow for visual confirmation that interface components are lined-up.

Single lap joint may enable better pressing of plates. The plates may be designed to offer large contact area for transfer of electrical currents.

Connection type between add-on and blade IDCS may be flexible (design-wise) based on existing blade and add-on design and constraints in the field.

Use of varying sizes of washers instead of receptors is cost-effective and allows easy manufacturing.

According to embodiments of the present invention, insulated, structurally integrated lightning protecting system for rotor blade tip add-on is provided.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An arrangement for discharging current due to a lightning stroke at a tip add-on of a rotor blade of a wind turbine, the arrangement comprising:
a plurality of receptors spaced apart from each other, arranged at defined positions axially along the tip add-on and which protrude from an airfoil wall of the tip add-on, the plurality of receptors configured to receive the lightning stroke;
a conductor configured to conduct the current received from one or more of the plurality of receptors due to the lightning stroke, wherein the conductor is disposed within the tip add-on and comprises an interface portion configured to be electrically connected to a blade internal down conductor system for discharging lightning stroke currents;
an insulation arranged around the conductor, wherein the insulation with the conductor is arrangeable within the tip add-on; and
an interface receiving container configured to receive the interface portion including a margin and to protect the interface portion from being contaminated during manufacturing the tip add-on, wherein the interface receiving container is configured to protect the interface portion from being contaminated during foaming an inside of the tip add-on;
wherein an inner space surrounding the airfoil wall of the tip add-on is completely filled with foam between the interface receiving container and the plurality of receptors.

2. The arrangement according to claim 1, wherein the insulation completely surrounds the conductor except at one end at which the tip add-on is to be connected to the rotor blade.

3. The arrangement according to claim 1, wherein the insulation is made of polymer and has a shape so as to restrict a location of the arrangement within the tip add-on to be in a predetermined position and/or extended configuration.

4. The arrangement according to claim 1, wherein the conductor comprising aluminum and/or steel and/or bronze and/or being partly flexible or rigid, comprises: at least one receptor base portion arranged to electrically and mechanically connect to at least one conducting receptor of the plurality of receptors.

5. The arrangement according to claim 1, wherein the interface portion comprises at least one connection plate to be joined with a connection plate of the blade internal down conductor system.

6. The arrangement according to claim 1, wherein the interface portion is configured to electrically and mechanically connect to a pair of conducting receptors to be exposed outside the tip add-on.

7. A tip add-on for a rotor blade of a wind turbine, comprising:
an arrangement according to claim 1,
wherein the tip add-on comprises at least one of:
a winglet; and
a tip extension.

8. A retrofitted rotor blade for a wind turbine, comprising:
a rotor blade including the blade internal down conductor system; and
a tip add-on according to claim 7 connected at an end of the rotor blade, wherein the conductor of the arrangement for discharging current due to a lightning stroke of the tip add-on is electrically connected to the blade internal down conductor system.

9. A method of retrofitting a rotor blade with a tip add-on, comprising:
performing a method of manufacturing a tip add-on of a rotor blade according to claim 8;
removing a blade tip receptor portion, if present, from the rotor blade;
installing a blade interface component at the rotor blade;
electrically connecting the installed blade interface component with the interface portion of the tip add-on; and
mechanically coupling the tip-add-on to the end of the rotor blade.

10. A method of manufacturing the tip add-on of a rotor blade, comprising:
manufacturing the airfoil wall partly enclosing the inner space;
manufacturing an arrangement for discharging a current due to lightning stroke according to claim 1; and
arranging the arrangement for discharging a current within the inner space of the tip add-on; and
foaming the inner space.

11. The arrangement according to claim 1, wherein, between a receptor base portion and the interface portion, the conductor comprises a spacer portion, further wherein the receptor base portion and/or the interface portion is larger in cross-section than the spacer portion.

12. The arrangement according to claim 11, wherein the spacer portion is formed at least partly as a flexible cable.

13. A method of manufacturing an arrangement for discharging a current due to lightning stroke at a tip add-on of a rotor blade of a wind turbine, the method comprising:
providing a plurality of receptors spaced apart from each other, arranged at defined positions axially along the tip add-on and which protrude from an airfoil wall of the tip add-on, the plurality of receptors configured to receive the lightning stroke, a conductor configured to conduct the current received from one or more of the plurality of receptors due to the lightning stroke, wherein the conductor is disposed within the tip add-on and comprises an interface portion configured to be electrically connected to a blade internal down conductor system for discharging lightning stroke currents, an interface receiving container configured to receive the interface portion including a margin and to protect the interface portion from being contaminated during manufacturing the tip add-on, wherein the interface receiving container is configured to protect the interface portion from being contaminated during foaming an inside of the tip add-on;
arranging around the conductor an insulation, wherein the insulation with the conductor is arrangeable within the tip add-on; and
foaming an inner space surrounding the airfoil wall of the tip add-on such that the inner space is completely filled with foam between the interface receiving container and the plurality of receptors.

* * * * *